(12) United States Patent
Zeng et al.

(10) Patent No.: US 11,115,263 B2
(45) Date of Patent: Sep. 7, 2021

(54) INTRA-CLUSTER NODE TROUBLESHOOTING METHOD AND DEVICE

(71) Applicant: HUAWEI TECHNOLOGIES CO., LTD., Guangdong (CN)

(72) Inventors: Yan Zeng, Hangzhou (CN); Fan Yu, Hangzhou (CN); Yinwen Wang, Hangzhou (CN); Yutao Shuai, Hangzhou (CN); Xiaoming Yue, Hangzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 27 days.

(21) Appl. No.: 16/732,749

(22) Filed: Jan. 2, 2020

(65) Prior Publication Data

US 2020/0145283 A1 May 7, 2020

Related U.S. Application Data

(63) Continuation of application No. PCT/CN2018/082663, filed on Apr. 11, 2018.

(30) Foreign Application Priority Data

Jul. 12, 2017 (CN) .......................... 201710564995.8

(51) Int. Cl.
*H04L 12/24* (2006.01)
*H04L 12/26* (2006.01)

(52) U.S. Cl.
CPC ........ *H04L 41/0686* (2013.01); *H04L 41/065* (2013.01); *H04L 41/0668* (2013.01);
(Continued)

(58) Field of Classification Search
CPC ............... H04L 41/0686; H04L 41/065; H04L 41/0668; H04L 41/0677; H04L 41/12; H04L 43/0829; H04L 43/10
See application file for complete search history.

(56) References Cited

U.S. PATENT DOCUMENTS 6,438,705 B1 * 8/2002 Chao .................... G06F 11/1425
714/4.11
9,098,392 B1 8/2015 Gadiraju et al.
(Continued)

FOREIGN PATENT DOCUMENTS

| CN | 102594596 A | 7/2012 |
| CN | 104378232 A | 2/2015 |

(Continued)

OTHER PUBLICATIONS

Abhinandan Das et al. SWIM: Scalable Weakly-consistent Infection-style Process Group Membership Protocol, Proceedings of the International Conference on Dependable Systems and Networks (DSN'02), 2002, total 10 pages.
(Continued)

*Primary Examiner* — Duc C Ho

(57) ABSTRACT

Embodiments of this application relate to an intra-cluster node troubleshooting method and device. The method includes: obtaining fault detection topology information of a cluster, where the fault detection topology information includes a fault detection relationship between all nodes in the cluster; obtaining a fault indication message, where the fault indication message is used to indicate unreachability from a detection node to a detected node; determining a sub-cluster of the cluster based on the fault detection topology information and the fault indication message, where nodes that belong to different sub-clusters are unreachable to each other; and determining a working cluster based on the sub-cluster of the cluster. According to the embodiments of
(Continued)

this application, available nodes in the cluster can be retained to a maximum extent at relatively low costs. In this way, a quantity of available nodes in the cluster is increased, high availability is ensured.

17 Claims, 6 Drawing Sheets

(52) U.S. Cl.
CPC .......... *H04L 41/0677* (2013.01); *H04L 41/12* (2013.01); *H04L 43/0829* (2013.01); *H04L 43/10* (2013.01)

(56) References Cited

U.S. PATENT DOCUMENTS

| | | |
|---|---|---|
| 9,292,371 B1 | 3/2016 | Clifford |
| 9,450,852 B1 | 9/2016 | Chen et al. |
| 2003/0179742 A1* | 9/2003 | Ogier .................... H04L 1/1887 370/351 |
| 2007/0006015 A1* | 1/2007 | Rao ...................... G06F 11/2028 714/4.1 |
| 2011/0158128 A1* | 6/2011 | Bejerano ................ H04L 45/16 370/256 |
| 2013/0041924 A1 | 2/2013 | Vernier |
| 2014/0189443 A1 | 7/2014 | Xu et al. |
| 2017/0093746 A1 | 3/2017 | Gahlot et al. |

FOREIGN PATENT DOCUMENTS

| | | |
|---|---|---|
| CN | 104796273 A | 7/2015 |
| CN | 105450717 A | 3/2016 |
| CN | 106209400 A | 12/2016 |
| CN | 106254103 A | 12/2016 |
| CN | 106656682 A | 5/2017 |

OTHER PUBLICATIONS

Robbert van Renesse et al. A Gossip-Style Failure Detection Service, Proceedings of the IFIP International Conference on Distributed Systems Platforms and Open Distributed ProcessingNov. 2009 pp. 55-70.

* cited by examiner

1

INTRA-CLUSTER NODE TROUBLESHOOTING METHOD AND DEVICE

CROSS-REFERENCE TO RELATED APPLICATIONS

This application is a continuation of International Application No. PCT/CN2018/082663, filed on Apr. 11, 2018, which claims priority to Chinese Patent Application No. 201710564995.8, filed on Jul. 12, 2017. The disclosures of the aforementioned applications are hereby incorporated by reference in their entireties.

TECHNICAL FIELD

This application relates to the field of computer technologies, and in particular, to an intra-cluster node troubleshooting method and device.

BACKGROUND

With development of distributed computing and cloud computing technologies in the information field, the conventional communications technology (CT) field has gradually transformed and developed into an information and communications technology (ICT). The ICT is a new concept and a new technical field formed by converging an information technology and a communications technology. During CT-to-ICT transformation and development, many complex and difficult problems need to be resolved inevitably. For example, network costs remain high due to operation of complex networks in the CT field, and therefore resolving a problem of the complex networks is quite important and challenging during CT-to-ICT transformation.

To promote CT-to-ICT transformation, Software Defined Network (SDN) has gradually developed. The SDN is a new network innovation architecture of an Emulex network, and is an implementation of network virtualization. During distributed SDN implementation or product cloudification, problems such as distributed cluster management need to be resolved inevitably.

An SDN service imposes a relatively high requirement on a communication capability of a cluster node, and a decentralized architecture of an Akka cluster ensures a capability of communication between nodes. Therefore, some companies use the Akka cluster to build a clustering capability of an SDN controller.

Nodes in the Akka cluster are classified into a leader node and a non-leader node. A function of the leader node is to add a node to or remove a node from the cluster, and other functions of the leader node are the same as those of an ordinary node.

An Akka fault detection mechanism is as follows: If a link is faulty or a fault of a random packet loss occurs on a node, because Akka cannot perceive whether a fault is specifically a link fault or a packet-loss fault of a node, and only a connection failure between nodes is detected through heartbeat detection, nodes at both ends of the link are removed to ensure reliability. Consequently, there is a high probability that a normal node is removed. According to an Akka fault detection and troubleshooting mechanism, when a network status is poor, an Akka cluster troubleshooting policy causes a high probability of incorrect removal in a scenario in which there is a link or node fault (breakdown or a severe packet loss occurs). As a result, no more than half of nodes in the cluster are left. However, normal running of a service often requires more than half of nodes in the cluster. Consequently, there is a high probability that the cluster is unavailable. This increases overheads of service migration and fault rectification, and causes serious impact on use of SDN by a user.

In a cluster architecture, regarding the foregoing problem, modification is usually made from a perspective of a gossip algorithm itself or fault detection in an industry technology. A method commonly used in the industry is as follows: When no heartbeat is detected between a node i and a node j, the node i delegates other nodes to ping the node j. If any one of the delegated nodes successfully pings the node j, it is considered that the node j is reachable. This method increases time spent on fault detection and a volume of data synchronized by using the gossip algorithm.

SUMMARY

Embodiments of this application provide an intra-cluster node troubleshooting method and device, so that when a link in a cluster is faulty, a faulty node and the faulty link can be accurately located, and a fault in the cluster is rectified at relatively low costs, thereby reducing a probability of service unavailability caused by cluster restart.

According to a first aspect, an embodiment of this application provides an intra-cluster node troubleshooting method. The method includes: obtaining fault detection topology information of a cluster, where fault detection is performed on one node in the cluster by at least one of other nodes in the cluster, fault detection is usually implemented by sending a detection packet (which is usually a heartbeat packet) by a detection node to a detected node, and the fault detection topology information includes a fault detection relationship between the detection node and the detected node in the cluster; obtaining a fault indication message from the detection node, where the fault indication message is used to indicate unreachability from the detection node to the detected node; determining a sub-cluster of the cluster based on the fault detection topology information and the fault indication message, where nodes that belong to different sub-clusters are unreachable to each other; and determining a working cluster based on the sub-cluster of the cluster, where the cluster in this embodiment of this application may be a decentralized cluster. The obtaining fault detection topology information of a cluster may specifically include: receiving fault detection topology information sent by another node in the cluster, or deducing the fault detection topology information according to a preset rule. In this embodiment of this application, when a link in the cluster is faulty, a sub-cluster obtained after removing the faulty link from the cluster may be determined based on the fault detection topology information of the cluster and the fault indication message, and a working cluster is determined based on the sub-cluster, so that an optimal sub-cluster can be selected as the working cluster, for example, a sub-cluster including a largest quantity of nodes may be selected, compared with the prior art in which two nodes at both ends of a faulty link are directly deleted or a to-be-deleted node is determined through additional detection.

It is easy to understand that any node in the cluster may act as a role of a detection node, or may act as a role of a detected node, or may act as roles of a detection node and a detected node in different fault detection relationships.

In this embodiment of this application, the sub-cluster is determined by using the fault detection topology information and the fault indication message, and an available sub-cluster generated after a fault occurs in the cluster may be determined at relatively low costs, and available nodes in the cluster are retained to a maximum extent. In this way, a quantity of available nodes in the cluster is increased, high availability is ensured, a probability of service unavailability caused by cluster restart is reduced, and overheads of fault rectification and service migration are reduced.

In an optional implementation, when the working cluster is determined, the following enumerated manners may be used:

determining the working cluster based on a quantity of nodes, for example, determining, as the working cluster, a sub-cluster having a largest quantity of nodes;

determining the working cluster based on a seed node, for example, determining, as the working cluster, a sub-cluster having a largest quantity of seed nodes;

determining the working cluster based on a node running a main service, for example, determining, as the working cluster, a sub-cluster having a largest quantity of nodes running a main service; and determining the working cluster based on a health status or a resource availability status, for example, determining, as the working cluster, a sub-cluster having a largest quantity of nodes whose health statuses meet a preset condition; or determining, as the working cluster, a sub-cluster having a largest quantity of nodes whose resource availability statuses meet a preset condition.

In addition, a plurality of factors in the foregoing enumerated manners may be simultaneously considered. For example, a sub-cluster including a seed node and having a largest quantity of nodes is determined as the working cluster; or a cluster having a largest quantity of nodes whose health statuses meet the preset condition and that run a main service is determined as the working cluster.

In an optional implementation, when the sub-cluster of the cluster is determined based on the fault detection topology information and the fault indication message, a faulty edge corresponding to the fault indication message is marked in a fault detection relationship topology formed based on the fault detection topology information, so as to determine a faulty link and/or a faulty node in the cluster, and determine, based on the determined faulty link and faulty node, sub-clusters whose nodes are unreachable to each other. In this embodiment of this application, the faulty link and the faulty node can be more properly determined according to a graph theory based on the fault detection relationship topology and more comprehensive information, so as to determine the working cluster more properly.

In an optional implementation, when the sub-cluster of the cluster is determined based on the fault detection topology information and the fault indication message, a faulty node and a faulty link that are determined based on the fault indication message and the fault detection topology information are marked in a network topology formed based on a network connection relationship between the nodes in the cluster, so as to determine the faulty link and the faulty node in the cluster, and determine, based on the determined faulty link and faulty node, sub-clusters whose nodes are unreachable to each other. In this embodiment of this application, the faulty link and the faulty node can be more properly determined according to a graph theory based on the network topology and more comprehensive information, so as to determine the working cluster more properly.

In an optional implementation, if a node is detected by a plurality of nodes, and it is determined, based on the fault indication message, that all detection nodes that detect the node are unreachable to the node, the node is a faulty node; or if a node is detected by a plurality of nodes, and it is determined, based on the fault indication message, that some detection nodes that detect the node are unreachable to the node and some detection nodes are still reachable to the node, a link between the node and a detection node that is unreachable to the node is a faulty link.

In an optional implementation, when the working cluster is determined based on the sub-cluster of the cluster, a sub-cluster in sub-clusters that has lowest costs and is capable of ensuring normal working can be selected as the working cluster, where more attributes inherited by the sub-cluster from the cluster indicate lower costs. The attribute may include a quantity of nodes, a quantity of seed nodes, a running main service, and the like. Specifically, the working cluster may be determined based on the sub-cluster of the cluster in any one or more of the following manners: determining, as the working cluster, a sub-cluster having a largest quantity of nodes; determining, as the working cluster, a sub-cluster including a seed node and having a largest quantity of nodes; determining, as the working cluster, a sub-cluster including a largest quantity of seed nodes; determining, as the working cluster, a sub-cluster having a largest quantity of nodes running a main service; and determining the working cluster based on a health status or a resource availability status. In this embodiment of this application, selection of the working cluster can be implemented, so as to meet conditions such as the following: the working cluster can run normally, is healthiest, or has lowest costs of affecting an existing service.

In another optional implementation, the determining a sub-cluster of the cluster based on the fault detection topology information and the fault indication message includes: determining, based on the fault detection topology information, a topology that is based on a fault detection relationship between the nodes, deleting, from the topology, an edge corresponding to the fault indication message, determining a connected subgraph of a topology obtained after deletion, and determining the sub-cluster based on the connected subgraph. In addition, a sub-cluster corresponding to a connected component or a strong connected component of the topology may be determined as the working cluster. In this embodiment of this application, the sub-cluster can be determined based on the topology that can reflect the fault detection relationship between the nodes in the cluster, and the sub-cluster can be more conveniently and accurately determined by using a connection relationship in the topology.

In still another optional implementation, after the working cluster is determined, the working cluster may further include a faulty link, in other words, both the detection node and the detected node in the fault indication information are included in the working cluster. In this case, the faulty link can be removed by deleting one or more nodes from the working cluster. A to-be-deleted node may be determined according to a preset rule. Specifically, the method further includes: determining that an unreachable node that is in unreachable nodes in the working cluster and to which a largest quantity of fault indication messages point is a to-be-deleted node; and sending a first indication message to another node in the cluster, where the first indication message is used to indicate the to-be-deleted node. In this embodiment of this application, the faulty link in the working cluster can be further removed, and the unreachable node to which a largest quantity of fault indication messages point is determined as the to-be-deleted node. Compared with the prior art in which two nodes at both ends of a link are directly deleted or a to-be-deleted node is determined through additional detection, in this embodiment of this application, available nodes in the cluster can be retained to a maximum extent at relatively low costs. In this way, a quantity of available nodes in the cluster is increased, high availability is ensured, a probability of service unavailability caused by cluster restart is reduced, and overheads of fault rectification and service migration are reduced.

An execution body of this embodiment may be any node in the cluster. In some embodiments, the node is referred to as a control node. In an optional implementation, the to-be-deleted node may be the control node itself. In this embodiment of this application, if the control node itself is on the faulty link, whether the control node is a to-be-deleted node needs to be determined, so as to ensure that all nodes learn of consistent information, and improve accuracy of locating the faulty node and the faulty link.

In another optional implementation, the determining that an unreachable node that is in unreachable nodes in the working cluster and to which a largest quantity of fault indication messages point is a to-be-deleted node includes: determining that an unreachable node that is in the unreachable nodes in the working cluster, to which a largest quantity of fault indication messages point, and whose health status is worst is the to-be-deleted node. The health status is determined based on a time in which the node makes a response to a heartbeat packet. In this embodiment of this application, the unreachable node can be deleted at relatively low costs based on the health status and a quantity of times a fault indication message points to the unreachable node. In this way, a probability of service unavailability is reduced.

According to a second aspect, an intra-cluster node troubleshooting method is provided. The method includes: obtaining fault detection topology information of a cluster, where fault detection is performed on one node in the cluster by at least one of other nodes in the cluster, and the fault detection topology information includes a fault detection relationship between a detection node and a detected node in the cluster; obtaining a fault indication message, where the fault indication message is used to indicate unreachability from the detection node to the detected node; and determining, based on the fault detection topology information, that an unreachable node to which a largest quantity of fault indication messages point is a to-be-deleted node. In this embodiment of this application, a control node can determine the to-be-deleted node provided that the control node receives a fault detection message sent by another node in the cluster. Compared with the prior art, the control node does not need to perform direct detection on the another node, thereby reducing load of the control node. When any node in the cluster is selected as the control node, impact on an original service of the node is reduced.

In another optional implementation, the determining that an unreachable node that is in unreachable nodes in a working cluster and to which a largest quantity of fault indication messages point is a to-be-deleted node includes: determining that an unreachable node that is in the unreachable nodes in the working cluster, to which a largest quantity of fault indication messages point, and whose health status is worst is the to-be-deleted node. The health status is determined based on a time in which the node makes a response to a heartbeat packet. In this embodiment of this application, the unreachable node can be deleted at relatively low costs based on the health status and a quantity of times a fault indication message points to the unreachable node, so that a probability of service unavailability is reduced.

In a possible implementation, after the to-be-deleted node is determined, a sub-cluster including a deleted node and a node that is not deleted in the cluster is determined based on the fault detection topology information, where nodes that belong to different sub-clusters are unreachable to each other; and the working cluster is determined based on the sub-cluster of the cluster. In this embodiment of this application, when a link in the cluster is faulty, a faulty node and the faulty link can be accurately located based on a topology, and an unreachable node in the cluster can be deleted at relatively low costs. In this way, a probability of service unavailability caused by cluster restart is reduced, and overheads of fault rectification and service migration are reduced.

In some possible implementations, when the sub-cluster is determined, the sub-cluster may be determined according to the method provided in the first aspect.

According to a third aspect, an embodiment of this application provides a troubleshooting device. The troubleshooting device has a function of implementing behavior of the node in the foregoing method. The function may be implemented by using hardware or by executing corresponding software by hardware. The hardware or software includes one or more units corresponding to the foregoing function.

In an optional implementation, the troubleshooting device includes a transceiver, a processor, and a memory, where the transceiver is configured to communicate with another node, and the memory is configured to store data and a program for a user. When the troubleshooting device runs, the processor executes a computer-executable instruction stored in the memory, so that the troubleshooting device performs the troubleshooting method in the first aspect and various optional implementations of the first aspect or the troubleshooting method in the second aspect and various optional implementations of the second aspect.

According to a fourth aspect, an embodiment of this application provides a computer-readable storage medium, configured to store a computer-readable instruction used by the foregoing troubleshooting device, where the computer-readable instruction includes a program designed for performing the foregoing first aspect and the optional implementations, or the second aspect and various optional implementations of the second aspect.

According to a fifth aspect, an embodiment of this application provides a computer program product, configured to store a computer-readable instruction used by the foregoing troubleshooting device, where the computer-readable instruction includes a program designed for performing the foregoing first aspect and the optional implementations, or the second aspect and various optional implementations of the second aspect.

DESCRIPTION OF EMBODIMENTS

An intra-cluster node troubleshooting method and device provided in the embodiments of this application may be applied to node troubleshooting of a decentralized cluster, specifically, deleting a faulty node by a node in the cluster, further selecting a working cluster, and the like.

Figure 1:
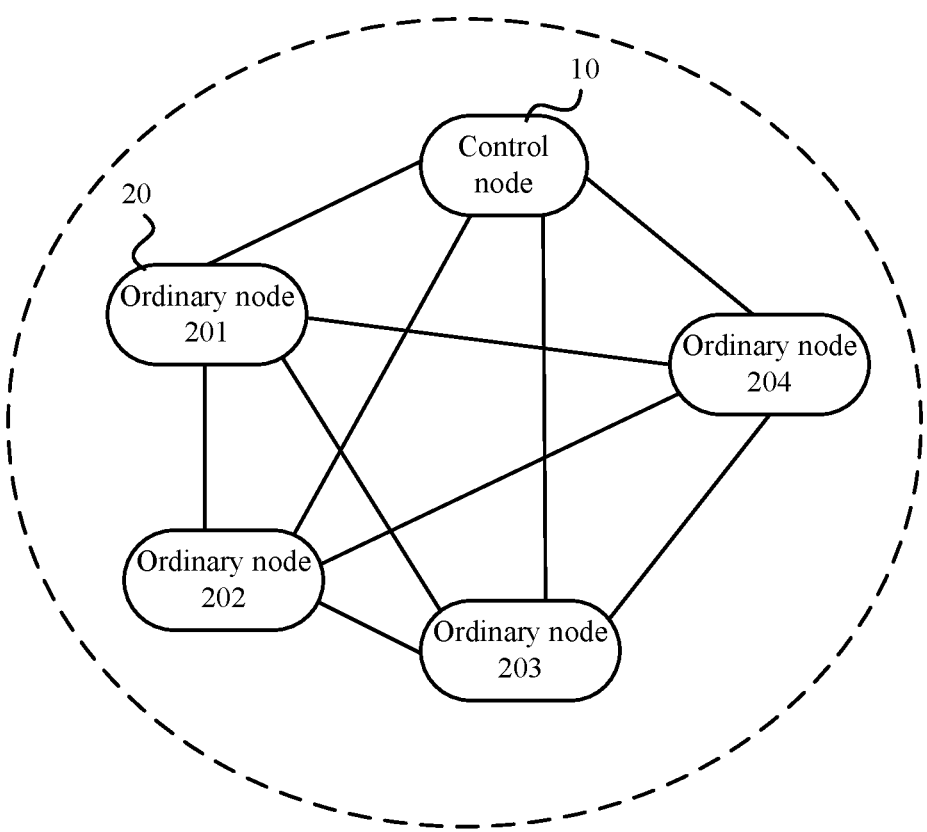
FIG. 1 is a schematic diagram of a network architecture.

The intra-cluster node troubleshooting method provided in the embodiments of this application is applicable to a scenario shown in FIG. 1. As shown in FIG. 1, a cluster includes a plurality of nodes. A node responsible for adding a node to the cluster or removing a node from the cluster is a control node 10, and other nodes are ordinary nodes 20. For example, the ordinary nodes 20 in FIG. 1 include an ordinary node 201, an ordinary node 202, an ordinary node 203, an ordinary node 204, and the like. The control node 10 is a node that meets a preset rule and that is in the plurality of nodes included in the cluster. For example, a reachable (reachable) node with a smallest IP-port in the plurality of nodes in the cluster is usually selected as the control node. If a control node needs to be re-determined due to a fault occurring on the control node or impact of another situation, a control node is selected from a remaining plurality of reachable nodes according to this rule.

Using an Akka cluster as an example, any member node in the Akka cluster is likely to become a leader (namely, a control node) of the cluster, and this is a deterministic result obtained based on a gossip convergence (Convergence) process. The leader is just a role, and the leader is constantly changing in each gossip convergence process. The role of the leader is to shift a member node (namely, an ordinary node) in or out of the cluster.

A member node begins in a joining state. Once all nodes have seen the node that newly joins the Akka cluster, the leader sets a state of the node to up.

If a node leaves the Akka cluster in a secure manner, a state of the node is expected to become a leaving state. When the leader learns that the node is in the leaving state, the leader changes the state of the node to exiting. Then, when all the nodes learn that the state of the node is exiting, the leader deletes the node and changes the state to a removed state.

If a node is in an unreachable (unreachable) state, the leader cannot perform any operation for convergence (Convergence) to the node based on the Gossip Protocol, and therefore the state of the node in the unreachable state needs to be changed. The state needs to be changed to a reachable state or a down state (that is, the node is deleted from the cluster). If the node in the down state expects to join the Akka cluster again, the node needs to be restarted and rejoin the cluster (through a joining state).

For normal running of the cluster, the nodes in the cluster identify a fault through fault detection, so as to perform troubleshooting. A fault detection relationship between nodes may include unidirectional detection and bidirectional detection. Detection performed only on one of two nodes means unidirectional detection, and mutual detection between two nodes means bidirectional detection. For example, as shown in FIG. 1, if the control node 10 performs detection on the ordinary node 202, or the ordinary node 202 performs detection on the control node 10, detection between the control node 10 and the ordinary node 202 is unidirectional detection. If the control node 10 and the ordinary node 201 are able to perform detection on each other, detection between the control node 10 and the ordinary node 201 is bidirectional detection.

It should be noted that the cluster shown in FIG. 1 is merely an example. The cluster in the embodiments of this application may include more or fewer nodes, and the nodes in the cluster may alternatively be connected in another manner.

This application provides an intra-cluster node troubleshooting method, apparatus, and device. A sub-cluster obtained after removing a faulty link from a cluster is determined based on fault detection topology information of the cluster and a fault indication message, and a working cluster is determined based on the sub-cluster, so that an optimal sub-cluster can be selected as the working cluster, for example, a sub-cluster including a largest quantity of nodes may be selected. Compared with the prior art in which two nodes at both ends of a faulty link are directly deleted or a to-be-deleted node is determined through additional detection, in the embodiments of this application, available nodes in the cluster can be retained to a maximum extent at relatively low costs. In this way, a quantity of available nodes in the cluster is increased, high availability is ensured, a probability of service unavailability caused by cluster restart is reduced, and overheads of fault rectification and service migration are reduced.

With reference to the accompanying drawings, the following describes in detail, by using specific embodiments and application scenarios thereof, an intra-cluster node troubleshooting method, apparatus, and device provided in the embodiments of this application.

Figure 2:
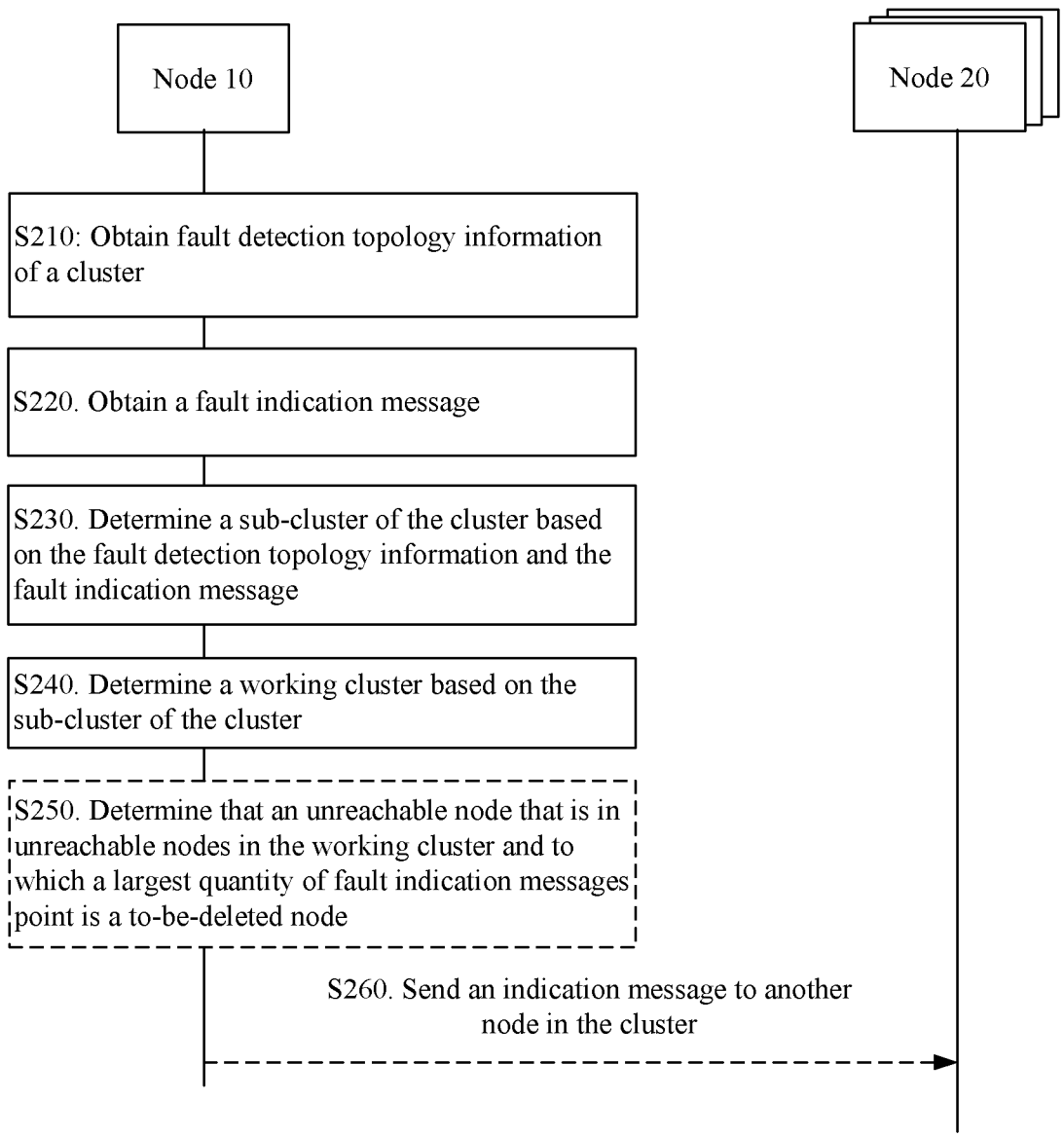
FIG. 2 is a schematic diagram of signaling exchange in an intra-cluster node troubleshooting method according to an embodiment of this application.

FIG. 2 is a schematic diagram of signaling exchange in an intra-cluster node troubleshooting method according to an embodiment of this application. As shown in FIG. 2, the method specifically includes the following steps.

S210: A control node obtains fault detection topology information of a cluster, where the topology information includes a fault detection relationship between a detection node and a detected node in the cluster, and fault detection is performed on one node in the cluster by at least one of other nodes in the cluster.

The fault detection topology information of the cluster may be determined according to a node detection mechanism. Specifically, each node sends a fault detection topology message to the control node, and each fault detection topology message is used to indicate one or more nodes on which one node performs fault detection. The control node receives a plurality of fault detection topology messages sent by the other nodes in the cluster, and may obtain a fault detection relationship between all nodes in the cluster with reference to all nodes on which the control node performs fault detection.

Alternatively, the fault detection topology information of the cluster may be deduced according to a preset rule. For example, the nodes in the cluster are numbered, and it is determined that the preset rule is that each node detects two nodes numbered after the node. After the control node determines numbers of the nodes in the cluster and the preset rule, the fault detection relationship between the nodes may be deduced, so as to obtain the fault detection topology information.

S220: The control node obtains a fault indication message from the detection node, where the fault indication message is used to indicate unreachability from the detection node to the detected node.

When determining that a link between a node and another node detected by the node is unreachable, the node may send a fault indication message to a node (including the control node) connected to the node. In the message, the detection node is the node itself and the detected node is the another node detected by the node.

A global cluster node list may be maintained on each node in the cluster based on the fault indication message, and the list may reflect a status of each node in the cluster. The status of the node includes whether the node is detected to be unreachable and that unreachability of the node is detected by which node.

Unreachability may alternatively be considered as an additional flag of a node status, and the flag is used to identify that another node in the cluster cannot communicate with the node normally.

S230: The control node determines a sub-cluster of the cluster based on the fault detection topology information and the fault indication message, where nodes that belong to different sub-clusters are unreachable to each other.

The fault detection message can be used only to determine that the detected node is unreachable, but cannot be used to determine whether unreachability is caused by a fault of a link between the detection node and the detected node or caused by a fault of the detected node. Therefore, on a basis that the fault detection topology information formed based on the fault detection relationship between all the nodes is obtained, a fault detection topology including a current fault indication message may be obtained based on the fault indication message. Based on a related theory of a graph theory, sub-clusters split from the cluster after fault occurrence may be determined.

In an implementation, a fault detection relationship topology may be formed based on fault detection relationship topology information. Each directed edge in the fault detection relationship topology represents a detection relationship between a detection node and a detected node. After a fault indication message is obtained, an edge that is corresponding to the fault indication message and that is between a detection node and a detected node is marked as a faulty edge, so as to obtain a fault detection relationship topology including the current faulty edge. Based on the topology, a faulty link and a faulty node in the cluster may be determined. For example, if unidirectional edges pointing to a same node include both a faulty edge and a normal edge, a detected link corresponding to the faulty edge is a faulty link. If all unidirectional edges pointing to a same node are faulty edges, the node is a faulty node. Based on the determined faulty node and faulty edge, whether the cluster is split into sub-clusters unreachable to each other may be determined.

It can be understood that, in some cases, although a faulty link or a faulty node occurs in the cluster, all the nodes in the cluster are still reachable to each other. In other words, the cluster is not split into sub-clusters. In this case, the determined sub-cluster is the original cluster itself.

S240: Determine a working cluster based on the sub-cluster of the cluster.

The working cluster may be determined according to three principles: service availability, cluster scalability, and service reliability.

After the control node removes the faulty link and determines that all the nodes in the cluster form one sub-cluster, the sub-cluster is the working cluster.

After the control node removes the faulty link and determines that all the nodes in the cluster form a plurality of sub-clusters, the working cluster may be determined in one or more of the following manners:

determining, as the working cluster, a sub-cluster having a largest quantity of nodes;

determining, as the working cluster, a sub-cluster including a seed node and having a largest quantity of nodes;

determining, as the working cluster, a sub-cluster including a largest quantity of seed nodes;

determining, as the working cluster, a sub-cluster having a largest quantity of nodes running a main service, where the main service may be a key service in all services, or may be a primary service in primary/secondary services;

determining the working cluster based on a health status or a resource availability status; and the like.

It should be noted that the cluster may include a seed node and a non-seed node. The seed node is statically configured by using a configuration file, and is a contact point used by an ordinary node to join the cluster. The non-seed node (an ordinary node) dynamically join the cluster by using the seed node.

For example, the control node may determine the working cluster based on the following conditions.

A sub-cluster having a large quantity of nodes and including at least one seed node is retained as the working cluster. If there is only one sub-cluster having a largest quantity of nodes and including at least one seed node, the sub-cluster in sub-clusters that has a largest quantity of nodes and includes at least one seed node is determined as the working cluster. If there are at least two sub-clusters having a largest quantity of nodes, the at least two sub-clusters have a same quantity of nodes, and both include a seed node, a sub-cluster in the at least two sub-clusters that has a large quantity of seed nodes is retained as the working cluster. In other words, if there are a plurality of sub-clusters having a largest quantity of nodes and including at least one seed node, a sub-cluster having a largest quantity of nodes and including a largest quantity of seed nodes is determined as the working cluster. If there are at least two sub-clusters having a largest quantity of nodes and including a largest quantity of seed nodes, and the at least two sub-clusters have a same quantity of nodes and include a same quantity of seed nodes, a sub-cluster to which a node with a smallest IP+port in the seed nodes belongs is determined as the working cluster.

This can ensure that only one sub-cluster survives, that is, ensure that only nodes in the working cluster work, and other nodes may be shut down, go offline, leave the cluster, or the like, so that the cluster can work normally.

Then, after the control node determines the working cluster, there may still be a faulty link in the working cluster. Usually, the faulty link does not cause the split brain of the cluster, that is, does not cause the cluster to be split into a plurality of sub-clusters. The control node may further remove the faulty link from the working cluster through decision-making, and specifically, may further include the following step.

S250: Determine that an unreachable node that is in unreachable nodes in the working cluster and to which a largest quantity of fault indication messages point is a to-be-deleted node.

The unreachable node to which a largest quantity of fault indication messages point is a node, in the working cluster, used as a detected node in the fault message.

Statistics on a quantity of times a fault indication message points to an unreachable node may be collected in the following plurality of manners.

Statistics collection may be directly performed on the received fault indication message, to determine a quantity of times a node is used as a detected node.

Alternatively, a global cluster node list may be maintained on each node in the cluster, and the list may reflect a status of each node in the cluster. The status of the node includes whether the node is reachable. Statistics collection may be further performed on a quantity of times an unreachable node is unreachable. A larger quantity of times an unreachable node is unreachable may be considered as a largest quantity of fault indication messages that point to the unreachable node.

For example, each node in the cluster may receive at least one fault indication message. If it is determined, based on the fault detection relationship between all the nodes in the cluster, that unidirectional fault detection is performed between a detection node and a detected node, the detected node corresponding to the indication message is marked as unreachable for one time. For example, an unreachable node set may be established, an unreachable node is added to the unreachable node set, and a quantity of unreachable times is recorded. If bidirectional fault detection is performed between a detection node and a detected node, the detection node and the detected node that are corresponding to the fault indication message are added to the unreachable node set, and quantities of unreachable times of the detection node and the detected node are separately recorded. If the detection node or the detected node in the fault indication message is the node itself, the node itself is added to the unreachable node set, and a quantity of unreachable times is recorded, so that all the nodes in the cluster obtain, through statistics collection, a same quantity of unreachable nodes and a same quantity of corresponding unreachable times.

The following describes in more detail how to determine the unreachable node.

Manner 1: If the cluster includes only a unidirectional link, each node in the cluster obtains the fault detection topology information after the cluster starts normally. The node in the cluster receives a fault indication message, and the fault indication message is used to indicate an unreachable event, that is, used to indicate unreachability from a detection node to a detected node. In this case, a corresponding detected node in the global cluster node list is marked as unreachable, and a quantity of unreachable times is increased by 1 each time when unreachability is detected by one node.

Manner 2: If the cluster includes only a bidirectional link, each node in the cluster obtains the fault detection topology information after the cluster starts normally. When the node in the cluster receives a fault indication message, a detection node and a detected node that are corresponding to the fault indication message are marked as unreachable in the global cluster node list, and quantities of unreachable times of the detection node and the detected node are each increased by 1 each time when a fault indication message is received. For example, in a packet loss scenario, it is detected, through heartbeat detection, that a link is unstable. When the link is faulty, it is detected that the link is unreachable, and a quantity of unreachable times is increased by 1. When the link is normal, it is detected that the link is reachable. When the link is faulty again, it is detected that the link is unreachable again, and the quantity of unreachable times is increased by 1 again. The foregoing process is repeated until a problem is resolved. When the node determines, based on the indication message, that the detected node and the detection node include the node itself, the node marks the node itself as unreachable in the global cluster node list maintained by the node.

Figure 3:
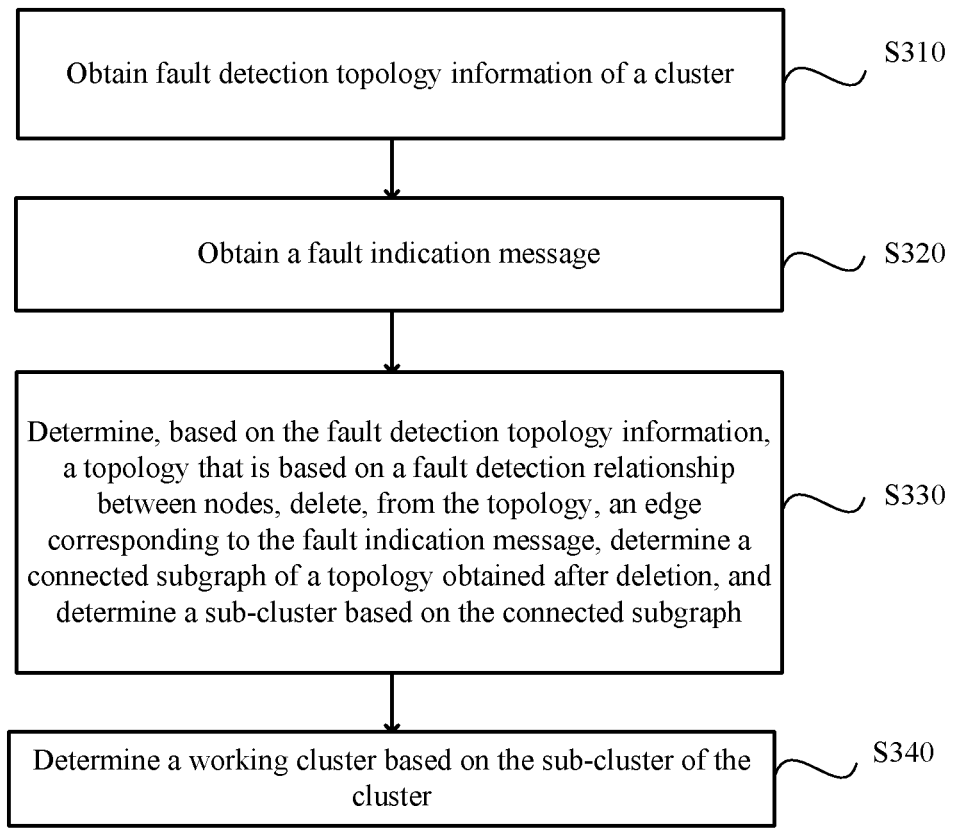
FIG. 3 is a schematic flowchart of another intra-cluster node troubleshooting method according to an embodiment of this application.

For example, with reference to FIG. 3, it is assumed that a severe packet loss occurs on a node 303. The node 303 is used as an example.

First time: The node 303 finds that a node 301 is unreachable. Because a link between the node 301 and the node 303 is a bidirectional link, a statistics result of a quantity of unreachable times on the node 303 is shown in the following Table 1:

TABLE 1

| Node | Quantity of unreachable times |
| --- | --- |
| Node 301 | 1 |
| Node 302 | 0 |
| Node 303 | 1 |

Second time: The node 303 marks a node 302 as unreachable. Because a link between the node 302 and the node 303 is a bidirectional link, the statistics result of the quantity of unreachable times on the node 303 is shown in the following Table 2:

TABLE 2

| Node | Quantity of unreachable times |
| --- | --- |
| Node 301 | 1 |
| Node 302 | 1 |
| Node 303 | 2 |

Manner 3: If the cluster includes both a bidirectional link and a unidirectional link, each node in the cluster obtains the fault detection topology information after the cluster starts normally. The node in the cluster receives a fault indication message. Each node in the cluster performs determining based on the fault detection topology information. If a link between a detection node and a detected node is a bidirectional link, the corresponding detection node and detected node in the global cluster node list are marked as unreachable, and quantities of unreachable times of the detection node and the detected node are each increased by 1. If a link between a detection node and a detected node is a unidirectional link, the corresponding detected node in the global cluster node list is marked as unreachable, and a quantity of unreachable times of the detected node is increased by 1. When the node determines, based on the indication message, that the detected node and the detection node include the node itself, and the link between the detection node and the detected node is a bidirectional link, the node marks the node itself as unreachable in the global cluster node list maintained on the node, and a quantity of unreachable times of the node is increased by 1.

For example, when a node i receives that a node k finds that a node j is unreachable (i≠k), a quantity of unreachable times of the node j is increased by 1. When receiving that the node i finds that the node j is unreachable, the node i determines, based on the fault detection topology information, whether a link between the node i and the node j is a bidirectional link. If the link is a bidirectional link, the node i is in a faulty link, and quantities of unreachable times of the node i and the node j are each increased by 1. If the link is a unidirectional link, the quantity of unreachable times of the node j is increased by 1.

A form of the global cluster node list maintained on each node may be shown in Table 3:

TABLE 3

| Node | Quantity of unreachable times |
|---|---|
| Node 1 | ... |
| Node 2 | ... |
| Node 3 | ... |
| ... | ... |

Alternatively, when the to-be-deleted node is determined, the to-be-deleted node may be determined based on the health status, to delete a node whose health status is worst. The health status may be determined based on a time in which the node makes a response to a heartbeat packet. For example, a health status of a node may be a phi value of the node. A calculation principle of the phi value is to obtain a normal distribution function through learning based on n times (for example, 1000 times) of recent historical sampling, and then evaluate a current heartbeat health status based on a current heartbeat response time. A larger phi value indicates a poorer heartbeat health status. When the phi value exceeds a specified threshold, the node is considered to be unreachable.

The health status of the node may alternatively be determined by using a quantity of unreachable times of the node in the global cluster node list. A larger quantity of unreachable times of the node indicates a poorer node health status.

S260: Send an indication message to another node in the cluster, where the indication message is used to indicate the to-be-deleted node.

After determining the to-be-deleted node, the control node needs to notify the another node in the cluster, so that the another node deletes the to-be-deleted node, or marks the to-be-deleted node as a deleted state (for example, a down state), thereby ensuring that the cluster can work normally.

In addition, because only the control node has permission to perform a deletion operation on a node in the cluster, a node in the cluster may determine whether the node itself is a control node. When the node itself is a control node, the node performs steps S250 and S260.

In addition, in this embodiment of this application, if an indication message including an unreachable event is still received after S210 to S230 are performed, that is, there may still be an unreachable node, S250 and S260 continue to be performed. This process is repeated until no indication message including an unreachable event is received anymore.

FIG. 3 is a schematic flowchart of another intra-cluster node troubleshooting method according to an embodiment of this application. A node may generate a topology based on fault detection information, and may perform troubleshooting based on the topology. As shown in FIG. 3, the method specifically includes the following steps.

S310: Obtain fault detection topology information of a cluster, where the fault detection topology information includes a fault detection relationship between a detection node and a detected node in the cluster, and fault detection is performed on one node in the cluster by at least one of other nodes in the cluster.

For obtaining of the fault detection topology information, refer to S210 in the foregoing embodiment shown in FIG. 2. Details are not described herein again.

S320: Obtain a fault indication message from the detection node, where the fault indication message is used to indicate unreachability from the detection node to the detected node.

For obtaining of the fault indication message, refer to S220 in the foregoing embodiment shown in FIG. 2. Details are not described herein again.

S330: Determine a fault detection relationship topology between nodes based on the fault detection topology information, delete, from the fault detection relationship topology, an edge corresponding to the fault indication message, determine a connected subgraph of a fault detection relationship topology obtained after deletion, and determine a sub-cluster based on the connected subgraph.

A fault detection relationship between the nodes in the cluster is included in the fault detection topology information of the nodes in the cluster. The fault detection relationship topology of the cluster may be determined based on the fault detection relationship between the nodes.

In a specific implementation process, nodes in the fault detection relationship topology may be connected by using a directed edge. In other words, the fault detection relationship topology reflects a fault detection direction. Alternatively, nodes in the fault detection relationship topology may be connected by using an undirected edge. In other words, the fault detection relationship topology does not reflect a fault detection direction.

For example, if there is only a bidirectional fault detection relationship or only a unidirectional fault detection relationship between the nodes in the cluster, the fault detection relationship topology may be a directed graph or an undirected graph when the fault detection relationship topology is determined. If there are both a bidirectional fault detection relationship and a unidirectional fault detection relationship between the nodes in the cluster, the fault detection relationship topology may be a directed graph when the fault detection relationship topology is determined. A fault detection relationship topology in which nodes are connected by using a directed edge is a directed graph, and a topology in which nodes are connected by using an undirected edge is an undirected graph.

Alternatively, the fault detection relationship topology may be determined after the fault detection topology information of the cluster is obtained. For example, a heartbeat detection mechanism in an Akka cluster is used. A node may determine a fault detection relationship topology of nodes in the Akka cluster based on received fault detection topology information that is based on the heartbeat detection mechanism. For example, if the received fault detection topology information includes fault detection topology information that a node a is a detection node and a node b is a detected node, and fault detection topology information that the node b is a detection node and the node a is a detected node, it is determined that the node a is connected to the node b, and the node a and the node b are in a bidirectional detection relationship. If the received fault detection topology information includes only information that the node a is a detection node and the node b is a detected node, it is determined that the node a is connected to the node b, and the node a and the node b are in a unidirectional detection relationship. If a fault detection relationship topology formed based on the fault detection topology information is a directed graph, a connection relationship between the node a and the node b is an indegree for the node b. If the received fault detection topology information of the cluster includes only an indication message that the node b is a detection node and the node a is a detected node, it is determined that the node a is connected to the node b, and the node a and the node b are in a unidirectional fault detection relationship.

Then, the fault indication message indicates unreachability from the detection node to the detected node, an edge between the detection node and the detected node is deleted from the fault detection relationship topology between the nodes, and a connected subgraph of a fault detection relationship topology obtained after deletion is determined. Connected subgraphs are independent of each other, and there is no interconnected node between the connected subgraphs. Each connected subgraph is corresponding to one sub-cluster.

In a specific implementation process of this embodiment of the present invention, usually, detection relationships between detection nodes and detected nodes in the cluster are relatively rich, so that the detection relationships can reflect a network topology relationship to some extent. In other words, all the nodes in the cluster can be detected by using the fault detection relationships in the cluster, and therefore a link status of the cluster can be determined based on the fault detection relationship topology.

In another implementation, S330 may alternatively be: determining a faulty node and a faulty link in the cluster based on the fault detection topology information and the fault indication message, deleting the faulty node and the faulty link from a network topology of the cluster, determining a connected subgraph of a network topology obtained after deletion, and determining the sub-cluster based on the connected subgraph of the network topology obtained after deletion, where the network topology includes information about network connections between all the nodes in the cluster.

In this implementation, the fault detection relationship topology is usually not completely equivalent to the network topology. In other words, the fault detection relationship in the cluster does not cover all links in the cluster. Therefore, when the sub-cluster is determined based on the network topology, whether a node is faulty or a link is faulty needs to be first determined. For example, if unidirectional edges pointing to a same node include both a faulty edge and a normal edge, a detected link corresponding to the faulty edge is a faulty link. If all unidirectional edges pointing to a same node are faulty edges, the node is a faulty node. If a node is faulty, in the network topology, it may be considered that all connections to the node are disconnected. If a link is faulty, in the network topology, it may be considered that only an edge corresponding to the faulty link is disconnected. Based on the determined faulty node and the faulty edge, and in combination with the network topology, it may be determined whether the cluster is split into sub-clusters unreachable to each other and which sub-clusters are specifically obtained through splitting.

S340: Determine a working cluster based on the sub-cluster of the cluster.

For a principle and a manner of determining the working cluster, refer to related descriptions of S240 in the foregoing embodiment.

In addition, in this embodiment of the present invention, when the working cluster is determined, a connected component or a strong connected component in the connected subgraph of the fault detection relationship topology obtained after deletion or of the network topology obtained after deletion may be determined, and a sub-cluster corresponding to the connected component or the strong connected component is determined as the working cluster.

If the fault detection relationship topology or the network topology is a directed graph, a largest component in a connected subgraph that is formed after the edge corresponding to the fault indication message is deleted is referred to as a strong connected component. If the fault detection relationship topology or the network topology is an undirected graph, a largest component in a connected subgraph that is formed after the edge corresponding to the fault indication message is deleted is referred to as a connected component.

If the fault detection relationship topology or the network topology obtained after the edge corresponding to the fault indication message is deleted has a plurality of connected components or strong connected components, the working cluster may be further determined based on a seed node, a node running a main service, a health status, a resource availability status, and the like. For details, refer to related descriptions of S240 in the foregoing embodiment.

Then, after the control node determines the working cluster, there may still be a faulty link in the working cluster. Usually, the faulty link does not cause the split brain of the cluster, that is, does not cause the cluster to be split into a plurality of sub-clusters. The control node may further remove the faulty link from the working cluster through decision-making. For details, refer to descriptions of steps S250 and S260 in the foregoing embodiment.

In addition, the control node may further determine a to-be-deleted node based on the fault detection relationship topology or the network topology.

Specifically, the fault detection relationship topology of the nodes in the cluster includes an edge corresponding to the fault detection relationship between the nodes in the cluster, and the network topology includes an edge corresponding to a network connection relationship between the nodes. According to a graph theory, a degree value of a node may be determined based on the fault detection relationship topology or the network topology. The control node may delete an unreachable node with a largest degree value from the cluster. Further, the control node may delete, from the cluster, an unreachable node, in an unreachable node set, with a largest indegree value representing a quantity of faulty edges. A larger quantity of faulty links related to the unreachable node indicates a larger probability that the node is a faulty node. An indegree value, representing a quantity of faulty links, of the unreachable node refers to a quantity of times the unreachable node serves as a node to which the faulty links point in the fault detection relationship topology or the network topology.

In addition, an unreachable node with a largest faulty-edge indegree value may include a plurality of unreachable nodes with a same faulty-edge indegree value. In this case, an unreachable node that is most unhealthy may be further determined as the to-be-deleted node based on health statuses of the unreachable nodes.

After deleting a node, the control node may further determine that another to-be-removed node and an isolated node that is formed after deletion of the node are to-be-deleted nodes. The isolated node is a node whose indegree value and outdegree value are both 0 in the fault detection relationship topology or the network topology.

Specifically, the control node determines a fault detection relationship topology or a network topology of the cluster from which the to-be-deleted node is deleted, and determines, based on the fault detection relationship topology or the network topology of the cluster from which the to-be-deleted node is deleted, that nodes, on all edges, whose indegree value and outdegree value are both 0 are to-be-further-deleted nodes.

According to this embodiment of this application, it can be implemented that, when a link is faulty, only one node (a node with a large phi value or a largest quantity of unreachable times) in the link is removed, and the cluster can run normally if a link between a remaining node and another node is not faulty. When n links (in parallel and without an intersection) are faulty, one node (a node with a large phi value or a largest quantity of unreachable times, where there are n nodes in total) in each link is removed, and the cluster can run normally if a link between a remaining node and another node is not faulty, where n is a positive integer. When n links (with an intersection) are faulty, the intersection (an intersection related to a largest quantity of faulty links is preferentially removed, and for intersections related to a same quantity of links, a node with a large phi value or a largest quantity of unreachable times is selected) is removed, and the cluster can run normally if a link between a remaining node and another node is not faulty.

In another embodiment, the to-be-deleted node may alternatively be deleted first. After deleting the to-be-deleted node, the control node may determine the working cluster. The working cluster is a sub-cluster, in sub-clusters, having a largest quantity of nodes and including at least one seed node. The sub-cluster is a cluster that does not include the to-be-deleted node or that includes only remaining nodes in the cluster including the to-be-deleted node.

The topology information of the nodes in the cluster includes the fault detection relationship between the nodes in the cluster. An unreachable node to which a largest quantity of fault indication messages point is determined as the to-be-deleted node based on the fault detection relationship. For example, a degree value of the unreachable node may be determined based on the topology that is based on the fault detection relationship between the nodes. The control node may delete, from the cluster, an unreachable node that is in the unreachable node set and that has a largest indegree value representing a quantity of faulty edges. Further, the control node may instruct the nodes in the cluster to delete the to-be-deleted node from the cluster.

In addition, nodes that are in the unreachable node set and that have largest indegree values representing a quantity of faulty edges may include a plurality of unreachable nodes with a same indegree value representing a quantity of faulty edges. In this case, an unreachable node that is most unhealthy may be further determined as the to-be-deleted node based on health statuses of the unreachable nodes.

If the cluster includes a plurality of most unhealthy nodes that have largest indegree values representing a quantity of faulty edges, a node with a largest IP+port is determined as the to-be-deleted node. Therefore, the control node is protected because the control node is usually a node with a smallest IP+port.

After the control node deletes the to-be-deleted node, the deleted node forms at least one sub-cluster, and a node that is not deleted also forms at least one sub-cluster. Each node in the cluster may determine, based on the topology and the deleted node, a sub-cluster to which the node belongs, and determine whether the cluster to which the node belongs is the working cluster. If the cluster to which the node belongs is the working cluster, each node in the working cluster is in a working state. If it is determined that the cluster to which the node belongs is not the working cluster, each node in the cluster may be in an off state.

The working cluster may be determined according to three principles: service availability, cluster scalability, and service reliability.

Specifically, a sub-cluster having a large quantity of nodes and including at least one seed node is retained as the working cluster.

If there is only one sub-cluster having a largest quantity of nodes and including at least one seed node, the sub-cluster in sub-clusters that has a largest quantity of nodes and includes at least one seed node is determined as the working cluster.

If there are at least two sub-clusters having a largest quantity of nodes, the at least two sub-clusters have a same quantity of nodes, and both include a seed node, a cluster in the at least two sub-clusters that has a largest quantity of seed nodes is retained as the working cluster. In other words, if there are a plurality of sub-clusters having a largest quantity of nodes and including at least one seed node, a sub-cluster having a largest quantity of nodes and including a largest quantity of seed nodes is determined as the working cluster.

If there are at least two sub-clusters having a largest quantity of nodes and including a largest quantity of seed nodes, and the at least two sub-clusters have a same quantity of nodes and include a same quantity of seed nodes, a cluster to which a node with a smallest IP+port in the seed nodes belongs is retained.

This ensures that only one sub-cluster survives, so that the cluster can work normally.

In specific implementation, when receiving an indication message that is used for indicating a to-be-deleted node and that is sent by a leader node, each node in the cluster determines, based on the fault detection relationship topology or the network topology of the nodes in the cluster, a sub-cluster to which the node belongs and determines whether the sub-cluster is the working cluster.

When determining, based on the fault detection relationship topology or the network topology, that the sub-cluster to which the node belongs is a sub-cluster having a largest quantity of nodes and including a seed node, the node determines that the sub-cluster to which the node belongs is the working cluster. When determining, based on the fault detection relationship topology or the network topology, that the sub-cluster to which the node belongs is not a sub-cluster having a largest quantity of nodes, the node determines that the sub-cluster to which the node belongs is not the working cluster.

When determining, based on the fault detection relationship topology or the network topology, that the sub-cluster to which the node belongs is one of at least two sub-clusters having a largest quantity of nodes, where the at least two sub-clusters having a largest quantity of nodes have a same quantity of nodes, and both include a seed node, the node further determines whether the cluster to which the node belongs is a cluster that includes a largest quantity of seed nodes and that is in the at least two sub-clusters having a largest quantity of nodes. If yes, the node determines that the sub-cluster to which the node belongs is the working cluster. If no, the node determines that the sub-cluster to which the node belongs is not the working cluster.

When determining, based on the fault detection relationship topology or the network topology, that the sub-cluster to which the node belongs is one of at least two sub-clusters having a largest quantity of nodes and including a largest quantity of seed nodes, where the at least two sub-clusters have a same quantity of nodes and a same quantity of seed nodes, the node further determines whether a node with a smallest IP+port in the seed nodes is in the sub-cluster to which the node belongs. If yes, the node determines that the sub-cluster to which the node belongs is the working cluster. If no, the node determines that the sub-cluster to which the node belongs is not the working cluster.

Figure 4:
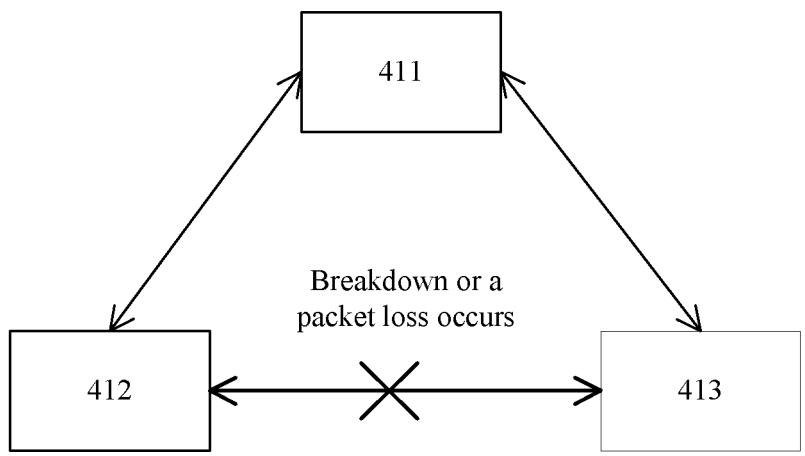
FIG. 4 is an example according to an embodiment of this application.

In an example, as shown in FIG. 4, a three-node cluster is used as an example, and a node 411 is a control node. Each node is detected (monitored) by the other two nodes in the cluster, and one heartbeat packet is sent between detection nodes every other second. If a link between a node 412 and a node 413 is faulty, during fault detection, the node 412 notifies the node 411 that "the node 413 is unreachable", and the node 413 notifies the node 411 that "the node 412 is unreachable".

According to an existing Akka troubleshooting mechanism, both the node 412 and the node 413 are removed from the cluster by the node 411, so that the node 411, the node 412, and the node 413 finally form three independent network segments.

According to a troubleshooting mechanism in a delegation method, after the foregoing case occurs, if the node 412 finds that the node 413 is unreachable, the node 412 delegates the node 411 to ping the node 413. If the node 411 can be in communication with the node 413, the node 413 is marked as reachable. If the node 413 finds that the node 412 is unreachable, the node 413 delegates the node 411 to ping the node 412. If it is found that the node 412 is reachable, the node 412 is marked as reachable. In this case, no node is removed, the link between the node 412 and the node 413 remains faulty, and a packet loss of service data always exists.

Based on this embodiment of this application, when a case shown in FIG. 4 occurs, fault detection information (for example, a fault detection relationship topology), shown in FIG. 4, in the cluster is first determined, and then a faulty link is determined and removed, to form one sub-cluster. The sub-cluster is determined as a working cluster. Because a faulty link still exists in the sub-cluster, a to-be-deleted node continues to be determined. Nodes to which a largest quantity of fault indication messages point are the node 412 and the node 413, and one of the node 412 and the node 413 is further determined as the to-be-deleted node. After the node 412 or the node 413 is deleted, the working cluster is "the node 411 and the node 413" or "the node 411 and the node 412".

Figure 5:
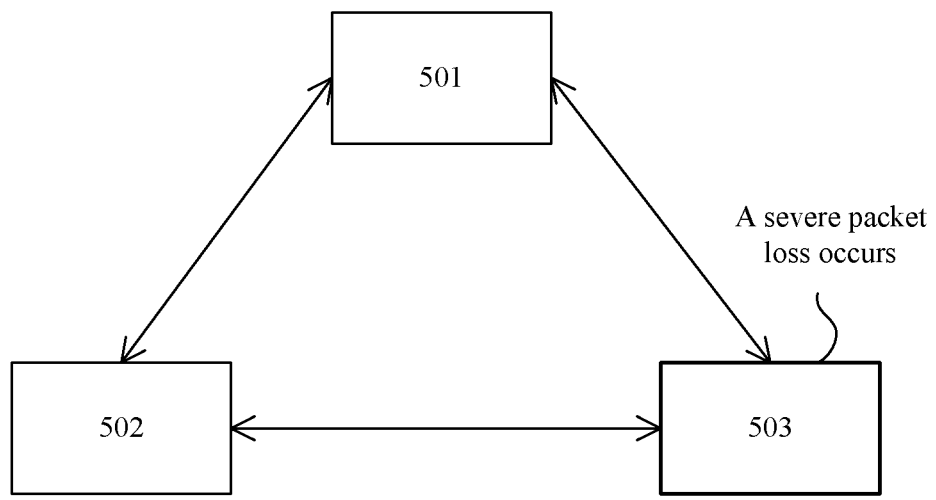
FIG. 5 is another example according to an embodiment of this application.

In another example, as shown in FIG. 5, if a severe packet loss occurs on a node 503:
  during fault detection, a node 501 considers that the node 503 is unreachable, and provides a notification to a node 502; the node 503 considers that the node 501 is unreachable, and provides a notification to the node 502; the node 502 considers that the node 503 is unreachable, and provides a notification to the node 501; and the node 503 considers that the node 502 is unreachable, and provides a notification to the node 501.

According to the existing Akka troubleshooting mechanism, each node is promoted to a leader and removes other nodes. In this case, a cluster is split into three independent clusters, and each cluster includes one node. When a leader node is in a faulty link, there may be a plurality of leaders. The plurality of leaders make different decisions, and consequently there is a high probability that the cluster is unavailable.

Based on this embodiment of this application, when a case shown in FIG. 5 occurs, fault detection information (for example, a topology that is based on a fault detection relationship), shown in FIG. 5, in the cluster is first determined, and then a faulty link is determined and removed, to form two sub-clusters. One sub-cluster includes the node 501 and the node 502, and the other sub-cluster includes the node 503. The sub-cluster including the node 501 and the node 502 in the two sub-clusters is determined as a working cluster. The working cluster does not include the faulty link, and the cluster runs normally.

Figure 6:
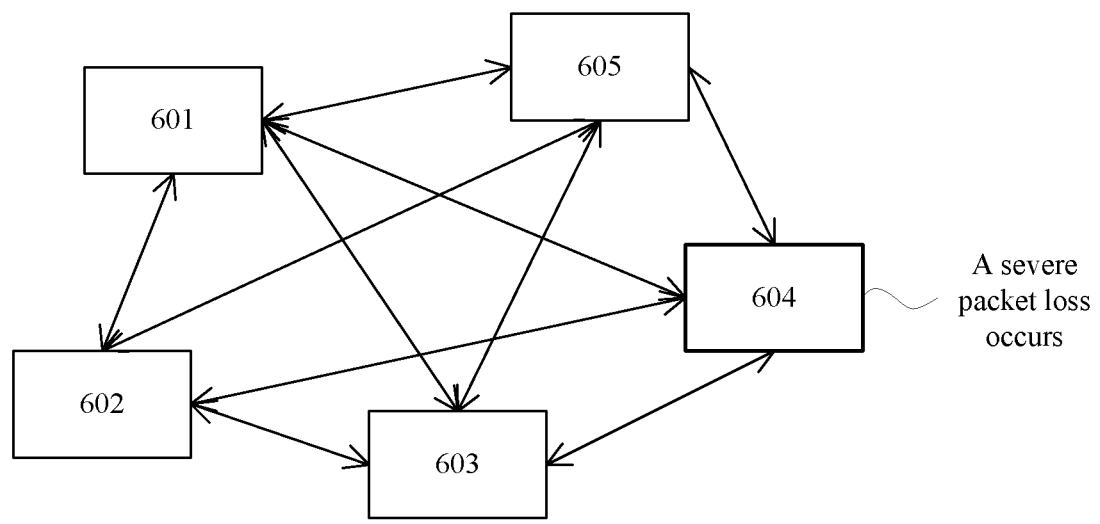
FIG. 6 is still another example according to an embodiment of this application.

In still another example, as shown in FIG. 6, a five-node cluster is used as an example. If a node 604 is faulty, and a severe packet loss occurs:
  in a fault detection process, it is assumed that a node 603 and a node 605 detect that the node 604 is unreachable, and the following cases are detected:
  The node 603 considers that the node 604 is unreachable, and provides a notification to a node 601, a node 602, and the node 605.
  The node 605 considers that the node 604 is unreachable, and provides a notification to the node 601, the node 602, and the node 603.
  The node 604 considers that the node 603 is unreachable, and provides a notification to the node 601, the node 602, and the node 605.
  The node 404 considers that the node 605 is unreachable, and provides a notification to the node 601, the node 602, and the node 603.

According to the existing Akka troubleshooting mechanism, the node 601 and the node 602 consider that the node 603, the node 604, and the node 605 are unreachable, a leader node (the node 601) removes the node 603, the node 604, and the node 605, and the node 601 and the node 602 are left, to form four network segments: "the node 601 and the node 602", "the node 603", "the node 604", and "the node 605". There are no more than half of nodes in any one of the network segments.

Based on this embodiment of this application, when a case shown in FIG. 6 occurs, fault detection information (for example, a fault detection relationship topology), shown in FIG. 6, in the cluster is first determined, and then a faulty link is determined and removed, to form two sub-clusters. One sub-cluster includes the node 601, the node 602, the node 603, and the node 605, and the other sub-cluster includes the node 604. The sub-cluster including the node 601, the node 602, the node 603, and the node 605 in the two sub-clusters is determined as a working cluster. The working cluster does not include the faulty link, and the cluster runs normally.

Figure 7:
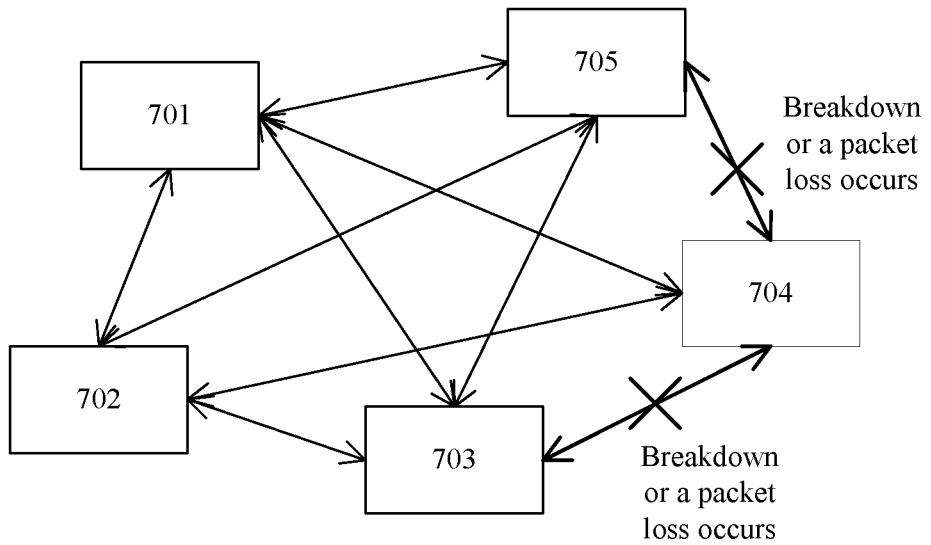
FIG. 7 is yet another example according to an embodiment of this application.

In yet another example, as shown in FIG. 7, if a link between a node 704 and a node 703 and a link between the node 704 and a node 705 are faulty: in a fault detection process, the following cases occur:
  The node 703 considers that the node 704 is unreachable, and provides a notification to a node 701, a node 702, and the node 705.
  The node 705 considers that the node 704 is unreachable, and provides a notification to the node 701, the node 702, and the node 703.
  The node 704 considers that the node 703 is unreachable, and provides a notification to the node 701 and the node 702. The node 701 and the node 702 send, to the node 705, information that the node 703 is unreachable.
  The node 704 considers that the node 705 is unreachable, and provides a notification to the node 701 and the node 702.

The node 701 and the node 702 send, to the node 703, information that the node 705 is unreachable.

According to the Akka troubleshooting mechanism, the node 701 and the node 702 consider that the node 703, the node 704, and the node 705 are unreachable. A leader node (the node 501) removes the node 703, the node 704, and the node 705, and the node 701 and the node 702 are left, to form four network segments: "the node 701 and node 702", "the node 703", "the node 704", and "the node 705". There are no more than half of nodes in any one of the network segments.

Based on this embodiment of this application, when a case shown in FIG. 7 occurs, fault detection information (for example, a fault detection relationship topology), shown in FIG. 7, in a cluster is first determined, and then a faulty link is determined and removed, to form one sub-cluster. The sub-cluster is determined as a working cluster. Because a faulty link still exists in the sub-cluster, a to-be-deleted node continues to be determined. A node to which a largest quantity of fault indication messages point is the node 704, and the node 704 is further determined as the to-be-deleted node. After the node 704 is deleted, the working cluster includes the node 701, the node 702, the node 703, and the node 705, and the cluster runs normally.

It can be learned, through the foregoing analysis, that an existing Akka policy has disadvantages. A high probability of incorrectly removing a normal node results in a high probability that the cluster is unavailable when a service requires more than half of nodes in the cluster.

The troubleshooting mechanism that is based on the delegation method has disadvantages. When a node i delegates another node to ping a node j, it needs to be ensured that the node i is in communication with b delegated nodes, and that the b nodes are in communication with the node j in a normal case. However, this requirement may not be necessarily met in an actual scenario. There is a long fault discovery time and a relatively large volume of data synchronized by using a gossip algorithm, and an existing network fault problem cannot be resolved.

Figure 8:
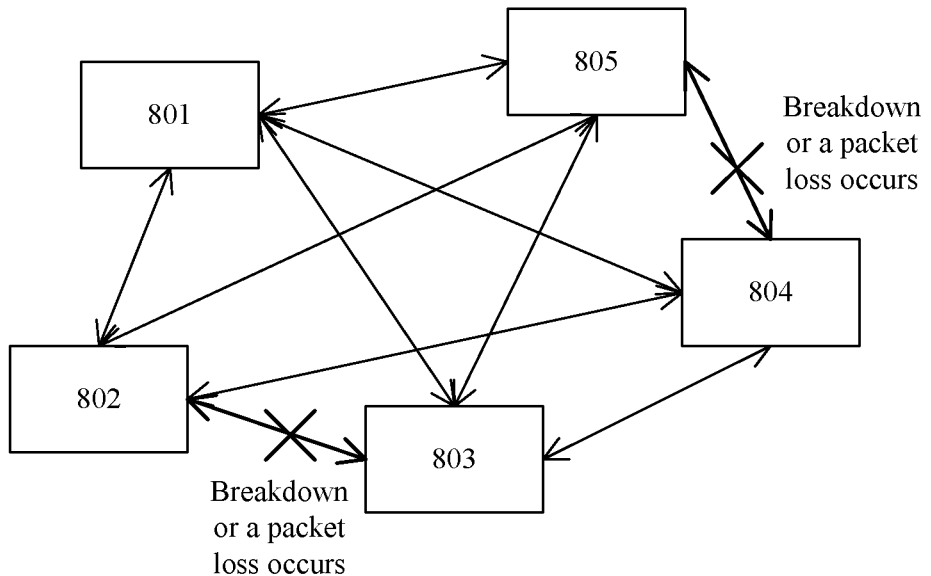
FIG. 8 is still yet another example according to an embodiment of this application.

As shown in FIG. 8, it is assumed that a link between a node 802 and a node 803 and a link between a node 804 and a node 805 are faulty, and phi(node 802)=0.8, phi(node 803)=0.85, phi(node 804)=0.9, and phi(node 805)=0.82.

Based on this embodiment of this application, when a case shown in FIG. 8 occurs, fault detection information (for example, a fault detection relationship topology), shown in FIG. 8, in a cluster is first determined, and then a faulty link is determined and removed, to form a sub-cluster. The sub-cluster is determined as a working cluster. Because a faulty link still exists in the sub-cluster, a to-be-deleted node continues to be determined. Nodes to which a largest quantity of fault indication messages point are the node 802, the node 803, the node 804, and the node 805. Because all degree values thereof are the same, a most unhealthy node, namely the node 804, is deleted. After the node 804 is deleted, a fault still exists in the cluster. The node 801 determines that nodes to which a largest quantity of fault indication messages point are the node 802 and the node 803. Because all degree values thereof are the same, a most unhealthy node, namely the node 803, is deleted. After the node 704 is deleted, the working cluster includes the node 801, the node 802, and the node 805. There are more than half of nodes in the cluster, and the cluster runs normally.

Figure 9:
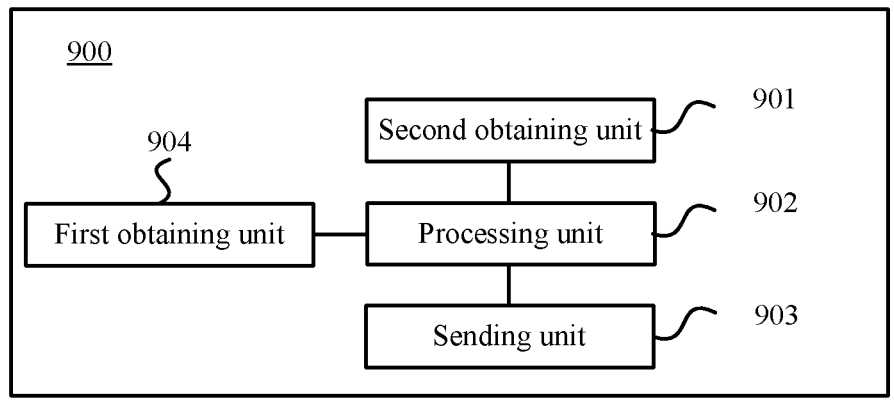
FIG. 9 is a schematic structural diagram of a troubleshooting apparatus according to an embodiment of this application.

FIG. 9 is a schematic structural diagram of a troubleshooting apparatus according to an embodiment of this application. The apparatus 900 is applicable to a cluster. This embodiment of this application is corresponding to the foregoing method embodiments shown in FIG. 2 and FIG. 3, and reference may be made to each other for understanding. The apparatus 900 specifically includes:

a first obtaining unit 904, configured to obtain fault detection topology information of the cluster, where fault detection is performed on one node in the cluster by at least one of other nodes in the cluster, and the fault detection topology information includes a fault detection relationship between a detection node and a detected node in the cluster;

a second obtaining unit 901, configured to obtain a fault indication message from the detection node, where the fault indication message is used to indicate unreachability from the detection node to the detected node; and a processing unit 902, configured to determine a sub-cluster of the cluster based on the fault detection topology information and the fault indication message, where nodes that belong to different sub-clusters are unreachable to each other.

The processing unit 902 is further configured to determine a working cluster based on the sub-cluster of the cluster.

Specifically, the processing unit 902 is further configured to perform any one or more of the following manners:

determining, as the working cluster, a sub-cluster having a largest quantity of nodes;

determining, as the working cluster, a sub-cluster including a seed node and having a largest quantity of nodes;

determining, as the working cluster, a sub-cluster including a largest quantity of seed nodes;

determining, as the working cluster, a sub-cluster having a largest quantity of nodes running a main service; and determining the working cluster based on a health status or a resource availability status.

Optionally, the processing unit 902 is further configured to: determine a fault detection relationship topology between nodes based on the fault detection topology information, delete, from the fault detection relationship topology, an edge corresponding to the fault indication message, determine a connected subgraph of a fault detection relationship topology obtained after deletion, and determine the sub-cluster based on the connected subgraph.

In another implementation, the processing unit 902 is further configured to: determine a faulty node and a faulty link in the cluster based on the fault detection topology information and the fault indication message, delete the faulty node and the faulty link from a network topology of the cluster, determine a connected subgraph of a network topology obtained after deletion, and determine the sub-cluster based on the connected subgraph of the network topology obtained after deletion, where the network topology includes information about network connections between all nodes in the cluster.

Further, the processing unit 902 is further configured to determine that an unreachable node that is in unreachable nodes in the working cluster and to which a largest quantity of fault indication messages point is a to-be-deleted node.

The device may further include a sending unit 903, configured to send a first indication message to another node in the cluster, where the first indication message is used to indicate the to-be-deleted node.

In addition, the to-be-deleted node may be the apparatus 900 itself.

Optionally, the processing unit 902 is further configured to determine that an unreachable node that is in the unreachable nodes of the working cluster, to which a largest quantity of fault indication messages point, and whose health status is worst is the to-be-deleted node. The health status is determined based on a time in which the node makes a response to a heartbeat packet.

Optionally, the first obtaining unit 904 is further configured to: receive fault detection topology information sent by another node in the cluster, or deduce the fault detection topology information according to a preset rule.

Figure 10:
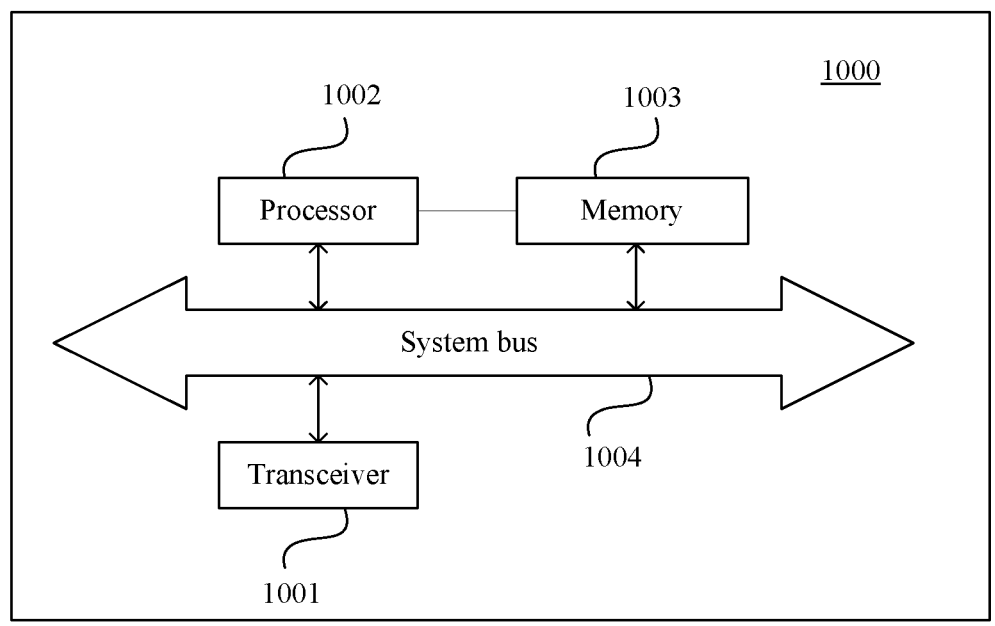
FIG. 10 is a schematic structural diagram of a troubleshooting device according to an embodiment of this application.

FIG. 10 is a schematic structural diagram of a troubleshooting device according to an embodiment of this application. The device 1000 is applicable to a cluster in this embodiment of the present invention. Nodes in the cluster may partially or completely run on a same troubleshooting device. For example, the nodes in the cluster may be virtual machines, and one or more virtual machines may run on each troubleshooting device. Alternatively, each troubleshooting device may be corresponding to one node in the cluster. As shown in FIG. 10, the device 1000 may include a transceiver 1001, a processor 1002, and a memory 1003. The processor 1002, the transceiver 1001, and the memory 1003 are connected and communicate with each other by using a bus 1004. The transceiver 1001 is configured to interact with another node, and may include a receiving unit and a sending unit. The memory 1003 is configured to store a program and data. The processor 1002 executes the program stored in the memory 1003, to perform a function of the troubleshooting device in the method embodiment of this application.

In addition, in the apparatus 900 described in FIG. 9, functions of the second obtaining unit and the sending module may be implemented by the transceiver in this embodiment of the present invention, and a function of the determining module is implemented by the processor in this embodiment of the present invention. A function of the first obtaining unit is implemented by the transceiver in this embodiment of the present invention when the first obtaining unit is configured to receive fault detection topology information sent by another node in the cluster. Alternatively, a function of the first obtaining unit is implemented by the transceiver in this embodiment of the present invention when the first obtaining unit is configured to deduce the fault detection topology information according to a preset rule.

It should be noted that the processor 1002 described in this application may be a processor, or may be a collective term of a plurality of processing elements. For example, the processor 1002 may be a central processing unit (CPU), an application-specific integrated circuit (ASIC), or one or more integrated circuits configured to implement this embodiment of the present invention.

The memory 1003 may be a storage apparatus, or may be a collective term of a plurality of storage elements, and is configured to store executable program code, or a parameter, data, and the like that are required for running of an access network management device. In addition, the memory 1003 may include a random access memory (RAM), and may further include a non-volatile memory (non-volatile memory), for example, a disk memory and a flash memory (Flash). The processor and the memory may be integrated into a processing circuit.

An embodiment of the present invention provides a cluster. The cluster includes at least one troubleshooting device described in any one of the foregoing embodiments.

The foregoing descriptions about implementations allow a person skilled in the art to understand that, for the purpose of convenient and brief description, division of the foregoing function modules is taken as an example for illustration. In actual application, the foregoing functions can be allocated to different modules and implemented depending on a requirement. To be specific, an inner structure of an apparatus is divided into different function modules to implement all or a part of the functions described above. For a detailed working process of the foregoing system, apparatus, and unit, refer to a corresponding process in the described method embodiments, and details are not described herein again.

In the several embodiments provided in this application, it should be understood that the disclosed system, apparatus, and method may be implemented in other manners. For example, the described apparatus embodiment is merely an example. For example, the module or unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected depending on actual requirements to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or the part contributing to the prior art, or all or a part of the technical solutions may be implemented in the form of a software product. The computer software product is stored in a storage medium and includes several instructions for instructing a computer device (which may be a personal computer, a server, a network device, or the like) or a processor (processor) to perform all or a part of the steps of the methods described in the embodiments of this application. The foregoing storage medium includes any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A troubleshooting method for nodes in a cluster, the method comprising:
   obtaining fault detection topology information of the cluster, fault detection being performed on one node in the cluster by at least one other node in the cluster, the fault detection topology information comprising a fault detection relationship between a detection node and a detected node in the cluster;
receiving a fault indication message from the detection node, the fault indication message indicating unreachability from the detection node to the detected node;
determining a sub-cluster of the cluster based on the fault detection topology information and the fault indication message, with nodes belonging to different sub-clusters of the cluster being unreachable to each other; and
determining a working cluster based on the determined sub-cluster.

2. The method according to claim 1, wherein the determining the working cluster based on the determined sub-cluster comprises any one of:
determining, as the working cluster, a sub-cluster having a largest quantity of nodes;
determining, as the working cluster, a sub-cluster comprising a seed node and having a largest quantity of nodes, wherein the seed node is a preconfigured node and a non-seed node joins the cluster using the seed node;
determining, as the working cluster, a sub-cluster comprising a largest quantity of seed nodes; or
determining, as the working cluster, a sub-cluster having a largest quantity of nodes running a main service.

3. The method according to claim 1, wherein the determining the working cluster based on the determined sub-cluster comprises:
determining the working cluster based on a health status or a resource availability status of a node in the determined sub-cluster, the health status of the node being determined based on a period of time in which the node makes a response to a detection packet.

4. The method according to claim 1, wherein the determining the sub-cluster based on the fault detection topology information and the fault indication message comprises:
determining a fault detection relationship topology between nodes based on the fault detection topology information;
deleting, from the fault detection relationship topology, an edge corresponding to the fault indication message to obtain an updated fault detection relationship topology;
determining a connected subgraph of the updated fault detection relationship topology; and
determining the sub-cluster based on the determined connected subgraph of the updated fault detection relationship topology.

5. The method according to claim 1, wherein the determining the sub-cluster based on the fault detection topology information and the fault indication message comprises:
determining a faulty node and a faulty link in the cluster based on the fault detection topology information and the fault indication message;
deleting the faulty node, the faulty link, or the faulty node and the faulty link from a network topology of the cluster to obtain an updated network topology;
determining a connected subgraph of the updated network topology, the updated network topology comprising information about network connections between all nodes in the cluster; and
determining the sub-cluster based on the determined connected subgraph.

6. The method according to claim 1, wherein the working cluster includes a set of unreachable nodes each being a detected node that has one or more fault indication messages pointing to it, each of the one or more fault indication messages being from a detection node and indicating unreachability from the detection node to the detected node, and the method further comprises:
determining, among the set of unreachable nodes in the working cluster, a first unreachable node that has a largest quantity of fault indication messages pointing to it as a to-be-deleted node; and
sending a first indication message to another node in the working cluster, the first indication message indicating the to-be-deleted node.

7. The method according to claim 6, wherein the determining the first unreachable node as the to-be-deleted node comprises:
determining, among the set of unreachable nodes in the working cluster, an unreachable node that has the largest quantity of the fault indication messages pointing to it and whose health status is worst, as the to-be-deleted node.

8. The method according to claim 1, wherein the obtaining the fault detection topology information of the cluster comprises:
receiving the fault detection relationship sent by another node in the cluster, and determining the fault detection topology information based on the received fault detection relationship; or
deducing the fault detection topology information according to a preset rule.

9. A troubleshooting device, comprising:
a transceiver configured to communicate with a detection node;
a memory storing instructions; and
a processor in communication with the transceiver and the memory, the processor executing the instructions to perform:
obtaining fault detection topology information of a cluster, fault detection being performed on one node in the cluster by at least one other node in the cluster, the fault detection topology information comprising a fault detection relationship between the detection node and a detected node in the cluster;
receiving a fault indication message from the detection node, the fault indication message indicating unreachability from the detection node to the detected node;
determining a sub-cluster of the cluster based on the fault detection topology information and the fault indication message, with nodes belonging to different sub-clusters of the cluster being unreachable to each other; and
determining a working cluster based on the determined sub-cluster.

10. The troubleshooting device according to claim 9, wherein the determining the working cluster based on the determined sub-cluster comprises any one of:
determining, as the working cluster, a sub-cluster having a largest quantity of nodes;
determining, as the working cluster, a sub-cluster comprising a seed node and having a largest quantity of nodes, wherein the seed node is a preconfigured node and a non-seed node joins the cluster using the seed node;
determining, as the working cluster, a sub-cluster comprising a largest quantity of seed nodes; or
determining, as the working cluster, a sub-cluster having a largest quantity of nodes running a main service.

11. The troubleshooting device according to claim 9, wherein the determining the working cluster based on the determined sub-cluster comprises:

determining the working cluster based on a health status or a resource availability status of a node in the sub-cluster, the health status of the node being determined based on a period of time in which the node makes a response to a detection packet.

12. The troubleshooting device according to claim 9, wherein the determining the sub-cluster based on the fault detection topology information and the fault indication message comprises:

determining a fault detection relationship topology between nodes based on the fault detection topology information;

deleting, from the fault detection relationship topology, an edge corresponding to the fault indication message to obtain an updated fault detection relationship topology;

determining a connected subgraph of the updated fault detection relationship topology; and determining the sub-cluster based on the determined connected subgraph of the updated fault detection relationship topology.

13. The troubleshooting device according to claim 9, wherein the determining the sub-cluster based on the fault detection topology information and the fault indication message comprises:

determining a faulty node and a faulty link in the cluster based on the fault detection topology information and the fault indication message;

deleting the faulty node, the faulty link, or the faulty node and the faulty link from a network topology of the cluster to obtain an updated network topology of the cluster;

determining a connected subgraph of the updated network topology, the updated network topology comprising information about network connections between all nodes in the cluster; and determining the sub-cluster based on the determined connected subgraph.

14. The troubleshooting device according to claim 9, wherein the working cluster includes a set of unreachable nodes each being a detected node that has one or more fault indication messages pointing to it, each of the one or more fault indication messages being from a detection node and indicating unreachability from the detection node to the detected node, and the processor further executes the instructions to perform:

determining, among the set of unreachable nodes in the working cluster, a first unreachable node that has a largest quantity of fault indication messages pointing to it as a to-be-deleted node; and sending a first indication message to another node in the working cluster, the first indication message indicating the to-be-deleted node.

15. The troubleshooting device according to claim 14, wherein the determining the first unreachable node as the to-be-deleted node comprises:

determining, among the set of unreachable nodes in the working cluster, an unreachable node that has the largest quantity of the fault indication messages pointing to it and whose health status is worst, as the to-be-deleted node.

16. The troubleshooting device according to claim 9, wherein the obtaining the fault detection topology information of the cluster comprises:

receiving the fault detection relationship sent by another node in the cluster, and determining the fault detection topology information based on the received fault detection relationship; or deducing the fault detection topology information according to a preset rule.

17. A non-transitory computer readable medium storing computer-readable instructions that when executed by a processor, cause the processor to perform operations comprising:

obtaining fault detection topology information of a cluster, fault detection being performed on one node in the cluster by at least one other node in the cluster, the fault detection topology information comprising a fault detection relationship between a detection node and a detected node in the cluster;

receiving a fault indication message from the detection node, the fault indication message indicating unreachability from the detection node to the detected node;

determining a sub-cluster of the cluster based on the fault detection topology information and the fault indication message, with nodes belonging to different sub-clusters of the cluster being unreachable to each other; and determining a working cluster based on the determined sub-cluster.

* * * * *

UNITED STATES PATENT AND TRADEMARK OFFICE
CERTIFICATE OF CORRECTION

| | |
|---|---|
| PATENT NO. | : 11,115,263 B2 |
| APPLICATION NO. | : 16/732749 |
| DATED | : September 7, 2021 |
| INVENTOR(S) | : Zeng et al. |

Page 1 of 1

It is certified that error appears in the above-identified patent and that said Letters Patent is hereby corrected as shown below:

In the Specification

Column 7, Line 30, change "IP-port" to "IP+port".

Signed and Sealed this
Fifth Day of October, 2021

Drew Hirshfeld
*Performing the Functions and Duties of the*
*Under Secretary of Commerce for Intellectual Property and*
*Director of the United States Patent and Trademark Office*